United States Patent [19]
Uchida et al.

[11] Patent Number: 5,648,013
[45] Date of Patent: Jul. 15, 1997

[54] PLASTIC ADDITIVE, PLASTIC COMPOSITION CONTAINING THE ADDITIVE AND PLASTIC MOLDING CONTAINING THE ADDITIVE

[75] Inventors: Mitsuru Uchida, Chofu; Tohru Matsumoto, Kawasaki, both of Japan

[73] Assignee: Canon Kabushiki Kaisha, Tokyo, Japan

[21] Appl. No.: 615,020

[22] Filed: Mar. 8, 1996

Related U.S. Application Data

[63] Continuation of Ser. No. 172,104, Dec. 23, 1993, abandoned.

[30] Foreign Application Priority Data

Dec. 24, 1992 [JP] Japan ................... 4-344633

[51] Int. Cl.$^6$ ................... C08J 3/20
[52] U.S. Cl. ................... 252/62.54; 524/431; 524/433
[58] Field of Search ................... 252/62.54; 524/431, 524/435

[56] References Cited

U.S. PATENT DOCUMENTS

| | | | |
|---|---|---|---|
| 3,669,922 | 6/1972 | Bartsch et al. | 524/431 |
| 3,983,060 | 9/1976 | Dill | 524/435 |
| 4,339,337 | 7/1982 | Tricot et al. | 252/62.54 |
| 4,798,856 | 1/1989 | Ayala et al. | 524/386 |

FOREIGN PATENT DOCUMENTS

| | | |
|---|---|---|
| 0244224 | 11/1987 | European Pat. Off. . |
| 0496112 | 1/1991 | European Pat. Off. . |
| 0427273 | 5/1991 | European Pat. Off. . |

OTHER PUBLICATIONS

Database WPI, Week 8504, Derwent Publications Ltd., AN 85–022553 (04) & JP-A-59 218 462 (Canon K.K.), Dec. 8, 1984.

Database WPI, Week 8742, Derwent Publications Ltd., AN 87–294514 (42) & JP-A-62 205 156 (Diacel Huls K.D.), Sep. 9, 1987.

*Primary Examiner*—Melissa Bonner
*Attorney, Agent, or Firm*—Fitzpatrick, Cella, Harper & Scinto

[57] ABSTRACT

A plastic additive containing thermoplastic polymer is provided in which the glass transition temperature of the thermoplastic polymer is from 40° C. to 80° C., and the plastic additive has magnetic particles dispersed therein. Also, a plastic composition containing an additive containing a thermoplastic polymer and plastic is provided in which the glass transition temperature of the thermoplastic polymer is from 40° C. to 80° C., and the plastic composition has magnetic particles dispersed therein. In addition, a molding formed of a plastic composition containing an additive containing thermoplastic polymer and plastic is provided in which the glass transition temperature of the thermoplastic polymer is from 40° C. to 80° C., and the molding has magnetic particles dispersed therein.

14 Claims, No Drawings

PLASTIC ADDITIVE, PLASTIC COMPOSITION CONTAINING THE ADDITIVE AND PLASTIC MOLDING CONTAINING THE ADDITIVE

This application is a continuation of application Ser. No. 08/172,104 filed Dec. 23, 1993, now abandoned.

BACKGROUND OF THE INVENTION

1. Field of the Invention

The present invention relates to an additive used in a plastic molding, to a plastic molding composition, and to a plastic molding. More particularly, the present invention relates to improvements in the coloring of a molding or in coloring aid thereof, or improvements in the dynamic (mechanical) characteristics, or an additive used to provide magnetic properties, a composition for molding and a molded composition.

2. Related Background Art

Hitherto, a black coloring pellet, what is commonly called a "master batch", having a coloring agent such as carbon as a main constituent thereof, has been mainly used for plastic coloring purposes. This coloring pellet is cylindrical or spherical, has a diameter of approximately 2 to 6 mm, and is colorant powder which is melted and kneaded with plastic.

Ordinarily, this coloring pellet is melted and kneaded with a plastic pellet or coarsely ground product by a mixing and kneading apparatus or the like, after which the coloring pellet is formed into a pellet again, or the coloring pellet is mixed with a raw material pellet in a solid state, and directly placed in a molding apparatus. Thus a colored molding is manufactured. In this case, depending upon the kneading performance of the molding apparatus, molding conditions such as molding temperature or molding speed, or the form of a molding, coloring components containing the colorant in the pellet are not dispersed with sufficient uniformity into the plastic. Density irregularities in the molded product and density differences between moldings occur, which phenomena are problematical. In the case of only the colorant, in some cases, colorant particles are separated from plastic with lapse of time and color tone varies, which phenomena are also problematical. In recent years, there has been an increased demand by consumers for more diversified products which satisfies their individual tastes and thus, in particular, in the case of black color there has been a demand for a method of obtaining black color tone different from carbon coloring. In addition, there has been a demand for an additive which can be used to increase the characteristics of a molding according to the application of the molding. Further, there has been a demand for an additive which provides a plastic molding with magnetic properties for specific applications.

SUMMARY OF THE INVENTION

It is an object of the present invention to provide an additive for plastic which does not cause density irregularities in the color tone within a molding.

It is another object of the present invention to provide a plastic composition which does not cause density irregularities in the color tone within a molding.

It is still another object of the present invention to provide a molding having no density irregularities in color tone.

It is yet still another object of the present invention to provide an additive and a plastic composition using the additive for the purpose of providing a molding with magnetic properties.

It is yet still another object of the present invention to provide a molding having improved mechanical properties.

The plastic additive in accordance with the present invention has a thermoplastic polymer and magnetic particles dispersed in the polymer, the glass transition temperature of the thermoplastic polymer being from 40° C. to 80° C.

According to the invention, dispersibility of the magnetic particles within the thermoplastic polymer and compatibility between an additive and plastic for forming a plastic molding are improved by using a thermoplastic polymer having a low glass transition temperature as an additive. Thus, it is possible to provide a molding having uniform color tone and uniform physical properties.

According to one aspect of the present invention, there is provided a plastic additive comprising a thermoplastic polymer, wherein the glass transition temperature of the thermoplastic polymer is from 40° C. to 80° C., and the plastic additive has magnetic particles dispersed therein.

According to another aspect of the present invention, there is provided a plastic composition comprising an additive containing a thermoplastic polymer and plastic, wherein the glass transition temperature of the thermoplastic polymer is from 40° C. to 80° C., and the plastic composition has magnetic particles dispersed therein.

According to still another aspect of the present invention, there is provided a molding formed of a plastic composition comprising an additive containing a thermoplastic polymer and plastic, wherein the glass transition temperature of the thermoplastic polymer is from 40° C. to 80° C., and the molding has magnetic particles dispersed therein.

DESCRIPTION OF THE PREFERRED EMBODIMENTS

The present invention provides an additive in which the above-described drawbacks are eliminated. The gist of the present invention lies in a plastic additive comprising a magnetic substance and thermoplastic polymer, the magnetic substance being dispersed within the thermoplastic polymer.

Preferred embodiments of the present invention will be explained below in more detail.

Preferred magnetic particles used in the present invention are ones having soft magnetism and a fine particle shape from among ferromagnetic materials such as metals or metallic oxides. It is preferred that the magnetic particles have a spherical or polygonal shape from the point of view of dispersibility and homogeneity. As magnetic particles, iron oxide ferrite having $Fe_2O_3$ as a main constituent is preferable. In particular, $FeO \cdot Fe_2O_3$ (magnetite) and $\gamma Fe_2O_3$ (maghemite) are particularly useful materials from the viewpoint that coloring and magnetic properties can be provided. Ferrite containing at least one of Co, Cu, Zn and Ni is preferably used for the purpose of providing magnetic properties.

The additive of the present invention contains magnetic iron oxide, preferably in an amount of 30 to 60 wt. %, such as triiron tetroxide dispersed in a thermoplastic polymer, is processed to a fixed form and then used.

Examples of thermoplastic polymer used in the present invention are various thermoplastic polymers, such as polyester polymer, styrene polymer, and acrylic polymer. Preferable examples are noncrystal polyester polymer and styrene polymer.

Polymers having ester bonding as the main chain of components is generally referred to as polyester polymer used in the present invention. The polyester polymer is synthesized by esterification of an acid and alcohol. It is possible to obtain a polymer having desired properties by selecting an acid and alcohol as required. Examples of acid constituents include maleic anhydride, fumaric acid, citraconic acid, and itaconic acid, all of which are unsaturated acids. Examples of saturated acids include phthalic anhydride, isophthalic acid, terephthalic acid, HET acid, succinic acid, adipic acid, azelaic acid, sebacic acid, tetrachlorophthalic anhydride, tetrabromophthalic anhydride, tetrahydrophthalic anhydride, and hexahydrophthalic anhydride. Examples of polybasic acids of three or more functionalities are: trimellitic acid, pyromellitic acid, and an anhydride thereof.

Alcohol components include: ethylene glycol, propylene glycol, butanediol 1.4, butanediol 1.3, butanediol 2.3, diethylene glycol, dipropylene glycol, triethylene glycol, pentanediol 1.5, hexanediol 1.6, neopentyl glycol, 2,2,4-trimethylpentandiol 1.3, bisphenol hydride, 2,2-di(4-hydroxyproxyphenyl) propane, pentaerythritol diallyl ether, glyceline, trimethylene glycol, 2-ethyl 1.3-hexanediol, phenylglycidyl ether, and allyglycidyl ether. In addition to the above-described examples of acids and alcohols, all acids and alcohols having well-known multifunctional groups can be used.

Examples of styrene polymers used in the present invention are: homopolymers of styrene and its substitution product such as polystyrene, poly-p-chlorostyrene, and polyvinyl toluene; and styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl mehacrylate copolymer, styrene-butyl methacrylate copolymer, styrene-stearyl methacrylate copolymer, styrene-lauryl methacrylate copolymer, styrene-methyl α-chloromethacrylate copolymer, styrene-acrylonitrile copolymer, styrene-vinylmethyl ether copolymer, styrene-vinylethyl ether copolymer, styrene-vinylmethyl ketone copolymer, styrene-butadiene copolymer, styrene-isobutylene copolymer, styrene-maleic acid copolymer, and styrene-maleic ester copolymer.

To manufacture the additive of the present invention, the above-described polymer material is used by itself or mixed with another component. In this case, it is preferable that a polymer composition have the following characteristics. One of them is that the transition temperature by a DSC method is from 40° C. to 80° C., and preferably from 50° C. to 70° C. The measurement of the thermal transition temperature by the DSC method is performed by a method specified in JIS K 7121. In another, it is preferable that the characteristics of the thermoplastic polymer are that its number average molecular weight be 50,000 or less and its weight average molecular weight be five or more times the number average molecular weight as regards the molecular weight and its distribution characteristics. The measurement of the molecular weight distribution is performed by gel permeation chromatography under the conditions described below after the reliability of the measurement range is fully confirmed by using a standard sample:

Apparatus: GPC-150C (manufactured by Waters Co., Ltd.)
Column: 7 series of KF801 to KF807 (manufactured by Showdex Co., Ltd.)
Temperature: 40° C. Solvent: THF (tetrahydrofuran)
Flow speed: 1.0 ml/min.
Sample: 0.1 ml of sample (concentration:0.05 to 0.6 wt. %) is injected.

When calculating the molecular weight of the sample, a molecular weight calibration curve prepared by using a monodispersed polystyrene standard sample is used.

The thermoplastic polymer having the above-described characteristics, in particular, has the following properties: it has a high affinity with a magnetic substance, magnetic particles being readily dispersed into the polymer so that the thermoplastic polymer can be easily processed to a desired form, thermal characteristics are appropriate, the melting and kneading operation is easily performed, and hydrophobicity is satisfactory. Also, the thermoplastic polymer is compatible to a certain degree with polypropylene, polyethylene, or polystyrene, all of which are general mold plastics, and has certain characteristics, for example, quality thereof does not deteriorate.

In the most typical magnetic substance, magnetic particles thereof used in the present invention are ones containing triiron tetroxide $Fe_3O_4$. It is preferable that the magnetic substance have an average particle diameter of 0.1 to 1.0 μm, and a true specific gravity of 5.0 or thereabouts be used, and particularly preferably that 80% of them be present in ±0.2 micron of the average particle diameter. It is preferred that the content of the magnetic substance contained in the additive of the present invention be from 30 to 60 wt. %, preferably from 45 to 55 wt. %. When the content is 30 wt. % or more, not only is there an increase in improvements caused by the additive, but also the magnetic substance is even more satisfactorily dispersed into the polymer during manufacture. When the content is 60 wt. % or less, the true specific gravity of the additive becomes approximately 1.9 or less, the difference between the above specific gravity and that of plastic is reduced. Thus, the dispersibility into plastic pellets or coarsely ground product becomes even more satisfactory.

When the additive of the present invention is used, it is preferred that the additive have an average particle diameter of 3 μm to 20 mm. For example, the additive can be used in the form of spherical or no fixed-shape powder of a volume average particle diameter of 3 μm, or in the form of no fixed-shape granules, beads, or pellets of a number average particle diameter of approximately 20 mm. One preferred form is powder of a volume average particle diameter of 5 to 20 μm. Another preferred form of the additive is powder in the form of a coarsely ground material, beads, or pellets of a number average particle diameter of approximately 1 to 10 mm. When used in the form of powder of a volume average particle diameter of 5 to 20 μm, preferably, the volume average particle diameter is 5.0 to 20.0 μm, and the content of fine powder of 4.0 μm or less is 50 number % or less, incorporation of coarse powder having a diameter of 30 μm or more being eliminated.

When used in the form of no fixed-shape granule, and, beads or pellets of a number average particle diameter of approximately 1 to 10 mm, more preferably, those of 75 μm or less, is 5 wt. % or less.

A coulter counter TA-II type (manufactured by Coulter Co., Ltd.) is used as a measuring apparatus. An interface (manufactured by Nikkaki) for outputting a number of pieces distribution and a volume distribution, and a CX-1 personal computer (manufactured by Canon Inc.) are connected to the measuring apparatus. First-class sodium chloride is used to prepare an approximately 1% NaCl solution as an electrolytic solution. Regarding a measurement method, 0.1 to 5 ml of a surfactant, preferably, alkylbenzene sulfonate, is added as a dispersant into 100 to 150 ml of the above-mentioned electrolytic solution, and further 2 to 20 mg of a measurement sample is added thereto. The electrolytic solution in which the sample is suspended is dispersed for approximately 1 to 3 minutes by an ultrasonic dispersing unit. The distribution of the volume of the particles is computed by the coulter counter TA-II type by using an aperture of 100 μm in order to compute the volume average particle diameter thereof.

According to a more preferred arrangement in accordance with the present invention, low-molecular weight crystalline polymer is added to a non-crystalline thermoplastic polymer such as polyester polymer or styrene polymer and then used. Preferred low-molecular weight crystalline polymers are petroleum waxes having a relatively weak polarity, preferably olefin of a low-molecular weight. Preferred low-molecular weight olefins include polymethylene, polyethylene polypropylene and their derivatives having a weight average molecular weight of 700 to 50,000, and more preferably, polyethylene or polypropylene and their derivatives having a weight average molecular weight of 800 to 7,000.

The measurement of the average molecular weight of the low-molecular weight olefin is performed under the conditions described below:
Apparatus: GPC-150C (manufactured by Waters Co., Ltd.)
Column: two series of GMH-HT (manufactured by Tosoh Corp.)
Temperature: 135° C.
Solvent: o-dichlorobenzene (0.1% ionol added)
Flow speed: 1.0 ml/min.
Sample: 0.4 ml of sample (concentration:0.15 wt. %) is injected.

When calculating the molecular weight of the sample, a molecular weight calibration curve prepared by using a monodispersed polystyrene standard sample is used, so that this weight is calculated by conversion using a conversion equation derived from a Mark-Houwink viscosity equation.

The above-mentioned low-molecular weight olefin is a polymer having very large sharp-melt properties. This olefin has an effect of improving the melt dispersibility during molding of the additive and of increasing coloring. Satisfactory results can be obtained even by a molding machine which performs insufficient kneading.

An appropriate amount of the addition of the low-molecular weight olefin is from 0.5 to 10 wt. %. When the amount added is 10 wt. % or more, fluidity of the additive is decreased, the dispersibility of the additive into the plastic is deteriorated, problems regarding quality, such as inhomogeneity or flow, occur on the molding.

It is more preferred in the present invention that inorganic fine particles by contained within the additive. Examples of inorganic fine particles are: silica, alumina, titanium oxide, barium titanate, magnesium titanate, calcium titanate, strontium titanate, zinc oxide, chromium oxide, cerium oxide, antimony trioxide, zirconium oxide, tin oxide, and silicon carbide. The inorganic fine particles are generally fine particles whose particle diameter of primary particles is from 2 to 1,000 μm. From among them, silica is most preferably used in the present invention.

The above-described inorganic fine particles can be used in the present invention even if their surface is treated with silicon oil, various surfactants or the like. It is possible for the amount of these inorganic fine particles added to be 0.1 to 3 wt. % and preferably 0.3 to 1.0 wt. %.

One of the physical properties of silica, which is most preferably used from among these inorganic fine particles, is that the specific surface area m²/g by nitrogen absorption can be measured by a BET method. 50 to 200 m²/g and preferably 80 to 130 m²/g of the specific surface area of silica can be added to the additive. In the case of an additive in a powder form, when these inorganic fine particles are added to the additive, the additive powder and inorganic fine particles are mixed by a mixer having a strong dispersing effect and then used. As a result, fluidity of the powder additive is increased, so that it becomes possible for the powder additive to be dispersed with sufficient ease, making it possible to increase a coloring effect and color tone during molding. When the inorganic fine particles are dispersed into a molding, it is possible to improve the dynamic (mechanical) characteristics of the molding. The inorganic fine particles may be mixed in a raw material state and mixed during melting for such a purpose.

The additive of the present invention is manufactured by the following steps by using the above-described thermoplastic polymer and a magnetic substance (triiron tetroxide $Fe_3O_4$) as a main raw material:

(1) dispersing the main raw material uniformly by a Henschel mixer or the like (2) melting and kneading the dispersed substance by a mixing apparatus such as a roll mill, a kneader, or an extruder (3) coarsely grinding the kneaded substance by a cutter mill, a hammer or the like, after which sieving or the like is performed so that a coarsely ground substance of a desired particle diameter is prepared and used as an additive.

(4) When the substance is used in the form of powder, after coarsely grinding it, fine grinding is performed on it by a jet mill or the like (5) classifying the finely ground substance by a classifier using wind force or coanda effect as required so that it is made a desired uniform particle diameter.

(6) adding inorganic fine particles, and mixing and stirring them by a Henschel mixer or the like.

(7) the mixture is sieved by a sieve having a coarseness of 100 mesh (screen aperture: approximately 150 μ) at most in order to eliminate coarsely ground powder.

When the additive of the present invention is manufactured, the above manufacturing steps therefor are very important. To obtain the additive of the present invention, first it is necessary to thoroughly disperse a magnetic substance under a sufficiently strong shear force (sheet stress). Coarse grinding and fine grinding must be performed carefully. If kneading is insufficient and grinding is not appropriate, insufficiently dispersed magnetic particles will be present in the additive, exerting adverse influences thereon. One way to avoid such a problem is to perform coarse grinding after melting and kneading and before the material is completely cooled and solidified. As a result, it is possible to prevent a free magnetic substance from being formed.

One preferred method of manufacturing the additive of the present invention is to obtain a powder state by the above-described steps and then to perform melting/grinding again. Such steps make it possible to prevent a free magnetic substance from being formed as much as possible.

The amount of addition of the additive of the present invention depends upon the application and manufacturing conditions of the molding, and it is preferably selected from the range of 0.1 to 90 wt. % based on the weight of the molding. The additive of the present invention is used for the purpose of coloring a molding or aiding in coloring thereof, or improving the dynamic (mechanical) characteristics thereof, or providing magnetic properties. It is possible to obtain a plastic composite composition having various characteristics. By combining plastic selected from olefin plastic and impact resistant polystyrene with the additive of the present invention, it is possible to obtain a molding material colored black. Impact resistance polystyrene having an IZOD impact value specified in JIS 7110 of 4 or more is preferable. These plastic can be used as a material for buildings, roads, box-shaped containers and returnable cases, hangers, flowerpots, dust boxes, trays, which are called general merchandise; or can be used for agricultural sheet as a sheet molding material.

Examples of polyolefine used for such above purposes in combination with the additive of the present invention are: polyethylene, polypropylene, and their derivatives including polyethylene of LD, HD, and LLD; EVAc, EEA PP and PP/PE.

Generally, the addition of the additive of the present invention into a molding raw material increases a compression strength and a flexural modulus of elasticity of a molding. Therefore, when manufacturing a molding used in a state in which returnable cases or the like are stacked on one another, it is possible to increase the strength of the molding at the same time black coloring is performed. The amount of the additive of the present invention added for such a purpose is preferably from 1.0 to 10 wt. %.

Another important characteristic of the additive of the present invention is that it gives magnetic properties to the molding material. By adding the additive of the present invention into a molding material, it is possible to obtain a magnetic plastic molding. The additive of the present invention contains a magnetic substance with soft magnetism, so that a molding having different magnetic characteristics can be obtained by varying the magnetic characteristics and the amount of the magnetic substance. Mixing of magnetic materials such as iron sand and the like into a molding material is known. However, when a magnetic substance is mixed into a molding material in the prior art, it is difficult to remove uneven distribution of the magnetic substance, and it is difficult to obtain a molding material having homogeneous magnetic characteristics. On the other hand, it becomes possible to obtain a composition having very homogeneous magnetic characteristics by using the composition of the present invention. The amount of the additive of the present invention added for such a purpose is preferably 0.1 to 90 wt. %.

An example of coloring polymer powder having inorganic fine particles added therein and containing a magnetic substance is magnetic toner. Magnetic toner is manufactured by adding low-molecular weight polyolefine, inorganic fine particles, and in some cases a polarity control agent to a polymer and a magnetic substance. If the magnetic toner's physical properties are in the same range as those of the additive of the present invention, the magnetic toner can be used satisfactorily. Magnetic toner used in copying machines, printers, FAXes or the like, and magnetic toner which is produced experimentally and discarded can be used if it satisfies the characteristics required by the present invention. In this case, waste toner which should originally be a waste can be effectively used, making it possible to effectively utilize resources. It is also possible to melt waste toner again by itself or after blended with a polymer, and then process it to a pellet or a coarsely ground product and use it.

In a further preferred arrangement of the present invention, paper powder is contained within the additive. Paper powder is mainly formed of paper slits or pulp fiber scraps generated during cutting. What is commonly called "plain paper" is manufactured by using wood pulp fibers as a main raw material and by adding thereto several % of various additives (rosin, aluminum sulfate, clay, talc or the like). Therefore, several % of these additives are contained in the paper powder used in the present invention.

Thorough research conducted by the inventors of the present invention shows that when a plastic molding is molded by using an additive containing paper powder, the strength characteristics of the molding are improved.

The amount of the paper powder added to the additive is possibly from 0.5 to 10 wt. %, preferably from 2 to 5 wt. %. If the amount of the paper powder added exceeds 10 wt. %, paper powder is liberated within the additive, and it thus becomes difficult for the paper powder to be dispersed into a molding. When the amount of the paper powder added is less than 0.5 wt. %, a paper powder addition effect cannot be exhibited. Although it is not clear why the strength characteristics of the molding are improved by using an additive to which paper powder is added, it may be assumed that pulp fibers and various additives have a filler effect.

An example of coloring polymer powder containing paper powder, inorganic fine particles, and a magnetic substance is magnetic cleaning waste toner. The magnetic cleaning waste toner is made by scraping off toner remaining on a photosensitive member in copying machines, printers, FAXes or the like using a magnetic toner after toner developed on the photosensitive member is transferred to "plain paper", by using a rubber blade or the like. The cleaning waste toner is stored continuously inside a copying machine's printer, and when more than a fixed amount is stored, it is discarded. The cleaning waste toner can also be used as a colored polymer powder if it satisfies the characteristics of the present invention.

EXAMPLE 1

Styrene-butyl acrylate polymer 100 parts by weight
Triiron tetraoxide (average particle diameter: 0.2 micron; the total amount of particles ranging from 0 to 0.4 microns: 90%) 90 parts by weight
Low-molecular weight polyethylene 5 parts by weight
After the above materials were mixed by a mixer, they were put into a continuous mixing apparatus and kneaded. After the kneaded mixture was cooled, it was crushed, thus additive coarse particles having a diameter of approximately 2 mm were obtained. The distribution of the coarse particles of the additive is as follows:

| | |
|---|---|
| Larger than 5.6 mm | 0.0% |
| From 2.8 mm to 5.6 mm | 13.6% |
| From 0.5 mm to 2.8 mm | 61.8% |
| Smaller than 0.5 mm | 24.6% |
| | 100.0% |
| Average particle diameter | 1.65 mm |
| Smaller than 0.075 mm | 1.8% |

When the thermal differential analysis (DSC measurement) of the coarse particles of the additive was performed, Tg=61° C. When the polymer component was extracted by THF and its molecular weight distribution was measured, its number average molecular weight was 18,000, and its weight average molecular weight was 220,000.

Next, the coarse particles of the additive and polyethylene (MI=7.0, 190° C., 1.6 kg) for molding were mixed together in a solid state by a mixer and kneaded, after which they were formed into a pellet by a pelletizer. The MI value is determined by a method of JIS K7210. The ratio of the coarse particles of the additive to the polyethylene was varied from 10% to 30%, and its mechanical characteristics were measured. The measurement was performed by a method of JIS K-7203.

As shown below, it was confirmed that black colored pellet having improved mechanical characteristics were obtained.

| Amount of additive added % | Color | Bending strength Kg/mm$^2$ | Flexural modulus of elasticity Kg/mm$^2$ |
| --- | --- | --- | --- |
| 0 | White | 2.07 | 80 |
| 10 | Black | 2.11 | 87 |
| 20 | Black | 2.15 | 91 |
| 30 | Black | 2.37 | 109 |

In this example and other examples, the particle diameter of magnetic particles (triiron tetroxide) was measured as described below.

A photograph of a sample of magnetic particles was taken at a magnification of 10,000 at an applied voltage 100 KV by an electron microscope (H-700H: manufactured by Hitach, Ltd.), and a final magnification was set at 30,000 by setting the printing magnification at three times as greater. Based on the above setting, the shape was observed, the maximum length (μm) of each particle was measured, 100 particles were selected randomly, and the average thereof was assumed to be the average particle diameter.

EXAMPLE 2

Styreye/2-ethylhexyl acrylate polymer 80 parts by weight
Styrene/butadiene polymer 20 parts by weight
Triiron tetroxide (average particle diameter: 0.2 micron; the total amount of particles ranging from 0 to 0.4 microns: 90%) 70 parts by weight
Low-molecular weight polyethylene 5 parts by weight After the above materials were mixed by a mixer, they were put into a continuous mixing apparatus and kneaded. After the kneaded mixture was cooled, it was crushed, thus coarse particles of an additive having an average size of approximately 1.65 mm were obtained. The distribution of the particle diameter of the coarse particles of the additive was as follows:

| | |
| --- | --- |
| Larger than 5.6 mm | 0.0% |
| From 2.8 mm to 5.6 mm | 14.4% |
| From 0.5 mm to 2.8 mm | 63.9% |
| Smaller than 0.5 mm | 21.7% |
| | 100.0% |
| Smaller than 0.075 mm | 1.7% |
| Average particle diameter | 1.65 mm |

When the thermal differential analysis (DSC measurement) of the coarse particles of the additive was performed, Tg=58° C. When the polymer component was extracted by THF and its molecular weight distribution was measured, its number average molecular weight was 10,000, and its weight average molecular weight was 200,000.

Next, after the coarse particles of the additive and polypropylene (MI=6.0, 230° C., 2.16 kg) for molding were mixed together in a solid state by a mixer and kneaded, they were formed into pellets by a pelletizer. The ratio of the coarse particles to polypropylene was varied from 5% to 10%, and the mechanical characteristics of the pellets were measured by the JIS K-7203 and K-7206 methods.

Black colored pellets were obtained as shown below.

| Amount of additive added % | Color | Bending strength Kg/mm$^2$ | Flexural modulus of elasticity Kg/mm$^2$ | Compressive strength Kgf/cm$^2$ |
| --- | --- | --- | --- | --- |
| 10 | Black | 3.16 | 118 | 2.45 |

Next, a stacking type two-way supply container (600 mm×440 mm×79 mm) was molded by an injection molding apparatus by using these pellets. The molding temperature was 240° C.

The test described below was performed for the molded two-way or returnable box on the basis of JIS Z1655, and the results described below were obtained.
1. Examination of the appearance
  1 There were no cracks, breaks or shortage of moldings.
  2 No deformation, discoloring, or color irregularities were observed.
  3 No burrs or peeling were observed.
2. Dimensional accuracy
  When the length, width, and height of the supply box, and the width of the top edge were measured, their dimensional accuracy satisfied the JIS standard.
3. Compression test
  Containers were stacked in three steps, and a load of 1 ton was applied vertically.
  There was no damage or deformation of the containers.
  When the containers were made in one step and left for three hours under standard conditions (23° C., 65% RH), a load was applied by a compression testing machine having a maximum load of 5 tons, the container did not break even at the maximum load. This confirmed that the container had a sufficient compressive strength.
4. Bottom corner falling test
  15 Kg of a sand bag (500 g×30 units) were placed in a container and maintained so that the diagonal line of the container become nearly vertical, and one corner was dropped freely three times from a height of 1 m. After dropping, it was examined whether there are damages. No damage was observed.
5. Bottom falling test
  15 Kg of a sand bag (500 g×30 units) was placed in a container, which was maintained nearly horizontally and dropped freely onto a concrete floor three times from a height of 1 m, after which it was examined whether there are damages. No damages were observed.

As described above, it was confirmed that the plastic composition using the additive of the present invention has satisfactory characteristics as a molding material for a returnable supply box.

COMPARATIVE EXAMPLE 1

Polystyrene (MI=7.5) for molding was used instead of styrene/2-ethylhexyl acrylate polymer of Example 2, and additive particles were produced.

When the thermal differential analysis (DSC measurement) of the coarse particles of this additive was made, Tg=103° C. Next, these coarse particles and polypropylene for molding used in Example 2 were mixed together by a mixer in a solid state and then kneaded, and formed into pellets by a pelletizer. The mechanical characteristics thereof were measured by methods of JIS K-7203 and JIS K-7206.

| Amount of additive added % | Color | Bending strength Kg/mm² | Flexural modulus of elasticity Kg/mm² | Compressive strength Kgf/cm² |
| --- | --- | --- | --- | --- |
| 10 | Black | 0.88 | 118 | 1.85 |

As described above, it was confirmed that this composition for molding does not have satisfactory characteristics as molding materials for a returnable supply box.

COMPARATIVE EXAMPLE 2

Ethylene-vinyl acetate copolymer (content of vinyl acetate:32%) was used instead of styrene/2-ethylhexyl acrylate polymer of Example 2. Although mixing and kneading were performed in the same way as in Example 2, melting was caused during grinding and particles could not be obtained inside a grinding apparatus according to an ordinary method. Therefore, freeze grinding was performed by using liquid nitrogen.

When the thermal differential analysis (DSC measurement) of the coarse particles of this additive was made, Tg=35° C. Next, these coarse particles and polypropylene for molding used in Example 2 were mixed together by a mixer in a solid state and then kneaded, and formed into pellets by a pelletizer. The coloring was very nonuniform and coloring density was unsatisfactory. As described above, it was confirmed that this composition for molding does not have satisfactory characteristics as molding materials for a returnable supply box.

EXAMPLE 3

Styrene/2-ethylhexyl acrylate polymer 80 parts by weight
Styrene/butadiene polymer 20 parts by weight
Triiron tetroxide (average particle diameter: 0.2 micron; the total amount of particles ranging from 0 to 0.4 microns:90%) 70 parts by weight
Low-molecular weight polyethylene 5 parts by weight
After the above materials were mixed by a mixer, they are put into a continuous mixing apparatus and kneaded. After the kneaded mixture was cooled, it was crushed, thus coarse particles having an average size of approximately 2 mm were obtained. The distribution of the particle diameter of the coarse particles was as follows:

| | |
| --- | --- |
| Larger than 5.6 mm | 0.0% |
| From 2.8 mm to 5.6 mm | 5.4% |
| From 0.5 mm to 2.8 mm | 74.8% |
| Smaller than 0.5 mm | 19.8% |
| | 100.0% |
| Average particle diameter | 1.65 mm |
| Smaller than 0.075 mm | 0.4% |

When the thermal differential analysis (DSC measurement) of the coarse particles of the additive was performed, Tg=58° C. When the polymer component was extracted by THF and its molecular weight distribution was measured, its number average molecular weight was 10,000, and its weight average molecular weight was 200,000.

Next, after the coarse particles and polypropylene (MI=35.1, 230° C., 2.16 kg) for molding were mixed together in a solid state by a mixer and kneaded, they were formed into pellets by a pelletizer. The ratio of the coarse particles to polypropylene was varied from 5% to 10%, and its mechanical characteristics were measured. The measurement was performed by methods of JIS K-7203 and K-7206.

It was confirmed that black colored pellets having improved mechanical characteristics were obtained as shown below.

| Amount of additive added % | Color | Bending strength Kg/mm² | Flexural modulus of elasticity Kg/mm² | Compressive strength Kgf/cm² |
| --- | --- | --- | --- | --- |
| 0 | White | 3.04 | 109 | 3.19 |
| 5 | Black | 3.64 | 140 | 3.77 |
| 10 | Black | 3.65 | 142 | 3.87 |

EXAMPLE 4

Styrene-butyl acrylate polymer 100 parts by weight
Triiron tetroxide (average particle diameter: 0.2 micron; the total amount of particles ranging from 0 to 0.4 microns: 90%) 70 parts by weight
Low-molecular weight polyethylene 5 parts by weight
After the above materials were mixed by a mixer, they are put into a continuous mixing apparatus and kneaded. After the kneaded mixture was cooled, it was crushed, thus additive coarse particles having a diameter of approximately 2 mm were obtained. After the coarse particles of the additive were further finely ground and classified, fine particles were obtained. Hydrophobic colloidal silica fine powder (primary particle diameter: 20 mµ, specific surface area: 110 m²/g) was added thereto, mixed and stirred by a mixer, after which it was passed through a sieve of 100 mesh (aperture: approximately 150 micrometer) Thus, the additive of the present invention was obtained. The distribution of the particle diameter of the additive was as follows:

| | % in terms of number of particles | wt. % |
| --- | --- | --- |
| Larger than 30.0 µm | 0.0% | 0.0% |
| From 12.7 µm to 30.0 µm | 8.9% | 42.8% |
| From 4.0 µm to 12.8 µm | 78.6% | 55.3% |
| Smaller than 4.0 µm | 12.5% | 1.9% |
| Total | 100.0% | 100.0% |
| Average particle diameter | 9.25 µm | 12.39 µm |

When the thermal differential analysis (DSC measurement) of the coarse particles of the additive was performed, Tg=51° C. When the polymer component was extracted by THF and its molecular weight distribution was measured, the number average molecular weight was 35,000, and the weight average molecular weight was 380,000.

Next, after the coarse particles of the additive and impact resistant polystyrene (Izod impact value: 7.50 kg-cm/cm²) for modling were mixed together in a solid state by a mixer and kneaded, they were formed into pellets by a pelletizer, after which they were molded into a flat plate form, 2 mm thick, by an injection molding machine, and its magnetic characteristics were measured.

The ratio of the fine particles of the additive to impact resistant polystyrene was varied from 15% to 75%. The magnetic characteristics were measured by using that a sensor signal of an excited sensor coil varies depending upon a magnetic substance. More specifically, a sensor coil is excited by a crystal oscillator (83.0 KHz), the sensor signal is detected and its output is displayed. The output of a measured sample when the output of a standard material (usually an aluminum plate) is determined to be 1 V is displayed. The results are shown in a table below.

| Amount of additive added % | Amount of additive (measured value) % | Output voltage V |
|---|---|---|
| 0 | 0% | 0.012 |
| 15 | 15% | 0.045 |
| 50 | 51% | 0.191 |
| 75 | 74% | 0.275 |

EXAMPLE 5

Styrene/2-ethylhexyl acrylate polymer 80 parts by weight
Styrene/butadiene polymer 20 parts by weight
Triiron tetroxide (average particle diameter: 0.2 micron; the total amount of particles ranging from 0 to 0.4 microns: 90%) 70 parts by weight
Low-molecular weight polyethylene 5 parts by weight
After the above materials were mixed by a mixer, they are put into a continuous mixing apparatus and kneaded. After the kneaded mixture was cooled, it was crushed, thus coarse particles of an additive having an average size of 1.65 mm were obtained. The distribution of the particle diameter of the coarse particles of the additive was as follows:

| Larger than 5.6 mm | 0.0% |
|---|---|
| From 2.8 mm to 5.6 mm | 14.4% |
| From 0.5 mm to 2.8 mm | 63.9% |
| Smaller than 0.5 mm | 21.7% |
|  | 100.0% |
| Smaller than 0.075 mm | 1.7% |
| Average particle diameter | 1.65 mm |

When the thermal differential analysis (DSC measurement) of the coarse particles of the additive was performed, Tg=58° C. When the polymer component was extracted by THF and its molecular weight distribution was measured, its number average molecular weight was 10,000, and its weight average molecular weight was 200,000.

Next, after 10 parts of these coarse particles and 90 parts of ethylene/vinyl acetate copolymer (MI=12.0, 190° C., 1.6 kg) were mixed in a solid state by a mixer, a sheet, 1 mm thick, was molded by a sheet molding apparatus (the cylinder diameter of an extruding machine:120 mm, L/D=25, L: length of kneading zone, D: diameter of cylinder) provided with a T-shaped die. The molding temperature was 200° C. The characteristics of the obtained molding are shown below.

| Amount of additive added | Color | Elongation % | Tearing strength Kg/mm$^2$ | Flexural modulus of elasticity Kgf/cm$^2$ | Bending strength Kgf/cm$^2$ |
|---|---|---|---|---|---|
| Additive added | Black | 736 | 8.3 | 1920 | 30 |
| No additive added | White | 659 | 7.9 | 900 | 23 |
| No additive added CB added | Black | 793 |  | 800 | 19 |

As described above, the bending and tearing characteristics of the manufactured sheet were improved. This sheet was used for stopping water on a side of a large vinyl house, and it was confirmed that the sheet had satisfactory characteristics for practical purposes.

EXAMPLE 6

Styrene/stearyl acrylate polymer 90 parts by weight
Styrene/butadiene polymer 20 parts by weight
γTriiron dioxide (average particle diameter: 0.4 micron; the total amount of particles ranging from 0.2 to 0.6 microns: 90%) 70 parts by weight
Low-molecular weight polyethylene 5 parts by weight
After the above materials were mixed by a mixer, they were put into a continuous mixing apparatus and kneaded. After the kneaded mixture was cooled, it was crushed, thus coarse particles of the additive having an average size of 2.55 mm were obtained. The particles of this additive were put into an extruding apparatus provided with a melting granulating unit. Bead-shaped particles having the following particle diameter distribution were obtained.

| Larger than 5.6 mm | 0.0% |
|---|---|
| From 2.8 mm to 5.6 mm | 16.0% |
| From 0.5 mm to 2.8 mm | 72.3% |
| Smaller than 0.5 mm | 11.70% |
|  | 100.0% |
| Smaller than 0.075 mm | 1.7% |
| Average particle diameter | 2.3 mm |

When the thermal differential analysis (DSC measurement) of the coarse particles of the additive was performed, Tg=65° C. When the polymer component was extracted by THF and its molecular weight distribution was measured, its number average molecular weight was 30,000, and its weight average molecular weight was 550,000.

Next, after 7 parts of these coarse particles and 93 parts of linear low-density polyethylene (MI=14.0, 190° C., 1.6 kg) were mixed in a solid state by a mixer, a sheet, 0.2 mm thick, was molded by a sheet molding apparatus (the cylinder diameter of an extruding machine:120 mm, L/D=25) provided with a T-shaped die. The molding temperature was 180° C. The characteristics of the obtained molding are shown below.

| Amount of additive added | Color | Elongation % | Tearing strength Kg/mm$^2$ | Flexural modulus of elasticity Kgf/cm$^2$ | Bending strength Kgf/cm$^2$ |
|---|---|---|---|---|---|
| Additive added | Brown | 736 | 8.3 | 19020 | 30 |

The obtained sheet was made to be a bag form and used to package parts.

EXAMPLE 7

100 parts by weight of polyester resin (Tg=55° C.) obtained by using 545 parts by weight of polyoxypropylene (2,5)-2,2-bis(4-hydroxyphenyl) propane, 135 parts by weight of terephthalic acid, and 38 parts by weight of trimellitic acid, 100 parts by weight of magnetic iron oxide (including triiron tetroxide or the like) powder (average particle diameter: 0.3μ), and 5 parts by weight of low-molecular weight polypropylene (weight average molecular weight: 8,000) were kneaded by a roll mill, after which it was crushed by a jet mill and classified by a zigzag classifier, thus colored resin powder having a volume average particle diameter of 10.0μ was obtained. 0.5 parts by weight of silica powder (primary particle diameter:20 µm, specific surface:110 m²/g) was added to 100 parts by weight of the above resin powder. They were mixed and stirred by a Henschel mixer and then passed through a sieve of 100 MESH (screen aperture: approximately 150 µ). Thus, an additive was obtained.

4.0 parts by weight of this additive and 100 parts by weight of polystyrene resin pellets of general purpose grade were put into a tumbler mixer where they were mixed and stirred. The mixture was put into an injection molding machine (SH50:manufactured by Sumitomo Heavy Industries, Ltd.), and several tens of plastic trays were molded continuously. When the obtained trays were inspected, no color irregularities within the trays or density differences between the trays were observed.

COMPARATIVE EXAMPLE 3

100 parts by weight of polystyrene resin used in Example 7 and 4 parts by weight of commercially available carbon pellets were mixed and stirred in the same way as in Example 7, and thus an additive was obtained. When trays were molded continuously in the same manner as in Example 7 by using the obtained additive, color irregularities within the trays and density differences between the trays were observed. When the strength thereof was measured, it was comfirmed that its tensile strength was particularly weaker than that obtained in Example 7.

EXAMPLE 8

100 parts by weight of polyester resin (Tg=54° C.) obtained by using 0.3 mole parts of terephthalic acid, 0.4 mole parts of benzene 1,2,4 tricarboxylic acid, and 1.0 mole part of polyoxypropylene (2,2)-2,2 bis(4-hydroxyphenyl) propane, 80 parts by weight of magnetic iron oxide fine powder (including triiron tetroxide $Fe_3O_4$, average particle diameter:0.8µ), and 8 parts by weight of low-molecular weight polyethylene (weight average molecular weight: 30,000) were melted and kneaded by an extruder, after which an additive in the form of cylindrical pellets having a diameter of approximately 4 mm and a height of approximately 5 mm was manufactured by using a pelletizer.

5.0 parts by weight of this additive and 100 parts by weight of HIPS (impact resistant polystyrene resin) pellet were put into a tumbler mixer where they were mixed and stirred and a mixture was obtained. This mixture was put into an injection molding machine where several tens of plastic model parts were molded continuously.

When density irregularities and density differences between model parts were inspected, no density irregularities or density differences were observed. The model parts were provided with a black color tone which was suitable for products because it gave the products the image of massiveness, which black tone had coloring unobtainable by carbon coloring.

EXAMPLE 9

100 parts by weight of polyester resin (Tg=54° C.) synthesized from 0.50 mole parts of terephthalic acid, 0.33 mole parts of benzene 1,2,4 tricarboxylic acid, and 1.0 mole part of polyoxypropylene (3,3)-2,2-bis(4-hydroxyphenyl) propane, 140 parts by weight of magnetic iron oxide (including triiron tetroxide $Fe_3O_4$, average particle diameter: 0.5 µ), and 10 parts by weight of low-molecular weight polypropylene (weight average molecular weight: 50,000) were kneaded by a roll mill, after which they were put into a crusher, and an additive having a particle diameter of 10 mm or less was obtained.

8.0 parts by weight of this additive, 50 parts by weight of polyethylene resin, and 50 parts by weight of polypropylene resin were mixed and stirred in the same way as in Example 7, and a mixture was obtained. The obtained mixture was put into an injection molding machine where several tens of plastic base plates were molded continuously. When the obtained base plates were inspected, no density irregularities or density differences between the base plates observed. The black color tone of the base plates was clearly different from that of a product of carbon coloring and manifested a black tone resembling a rich luxurious natural rock. When the strength of the above base plates was compared with that of the carbon colored base plates, it was confirmed that the strength has been increased. Also, when durability was compared, it was confirmed that the change in the black color tone with lapse of time was superior to a product of carbon coloring only.

EXAMPLE 10

100 parts by weight of styrene-vinyl toluene copolymer (Tg=64° C.), 100 parts by weight of magnetic iron oxide (including triiron tetroxide or the like) powder (average particle diameter:0.3µ), and 5 parts by weight of low-molecular weight polypropylene (weight average molecular weight: 8,000) were kneaded by a roll mill, after which they were crushed by a jet mill and classified by a classifier. Thus, coloring resin powder having a volume average particle diameter of 9.0 µm and whose content of fine powder of 40 µm or less is 20.0% in terms of number of particles was obtained. 0.5 parts by weight of silica powder (primary particle diameter:20 mµ, specific surface: 110 m²/g) and 3.0 parts by weight of paper powder (sampled when PPC paper was cut) were added to 100 parts by weight of the resin powder, mixed and stirred by a Henschel mixer, and then passed through a sieve of 100 MESH (screen aperture: approximately 150µ). Thus, an additive was obtained.

1.0 parts by weight of this additive, 100 parts by weight of polystyrene resin pellet of general purpose grade, 3 parts by weight of commercially available carbon colored pellet were put into a tumbler mixer where they were mixed and stirred.

The obtained mixture is put into an injection molding machine (SH50: manufactured by Sumitomo Heavy Industries, Ltd.), and several tens of plastic trays were molded continuously. When the obtained trays were inspected, no color irregularities within the trays or density differences between the trays were observed. When they were compared with a product which was only carbon colored, they were superior in properties such as color irregularities or density differences, and it was confirmed that particularly tensile strength and bending strength have been improved.

EXAMPLE 11

100 parts by weight of styrene-butyl acrylate copolymer resin (Tg=57° C.), 80 parts by weight of magnetic iron oxide fine powder (including triiron tetroxide $Fe_3O_4$, average particle diameter: 0.8µ), and 8 parts by weight of low-molecular weight polyethylene (weight average molecular weight: 30,000) were kneaded by a roll mill, and crushed by a jet mill. Thus, coloring resin powder having a volume average particle diameter of 8.0 µm was obtained.

1.0 parts by weight of silica powder (primary particle diameter: 30 mµ, specific surface: 90 m²/g) was added to 100 parts by weight of the resin powder, and mixed and stirred by a Henschel mixer, and then passed through a sieve of 100 MESH (screen aperture: approximately 150μ). Thus, an additive was obtained.

2.0 parts by weight of this additive, 100 parts by weight of HIPS (impact resistant polystyrene resin), and 40 parts by weight of commercially available carbon colored pellets were mixed and stirred by a tumbler mixer. This mixture was put into an injection molding machine, and several tens of plastic model parts were molded continuously. When density irregularities between the model parts and density irregularities between the parts were inspected, no density irregularities or density irregularities were observed. The color tone of the model parts was suitable because it gave the product the image of massiveness, and manifested black color tone most suitable as a product as compared with parts of carbon coloring only.

EXAMPLE 12

100 parts by weight of styrene-butadiene copolymer resin (Tg=64° C.), 140 parts by weight of magnetic iron oxide (including triiron tetroxide $Fe_3O_4$, average particle diameter: 0.5 μ), 10 parts by weight of low-molecular weight polypropylene (weight average molecular weight: 50,000) were kneaded by a roll mill, and crushed by a jet mill. Thus, coloring resin powder having a volume average particle diameter of 20.0μ was obtained.

1.0 parts by weight of alumina fine powder was added to 100 parts by weight of this resin powder, mixed and stirred by a Henschel mixer, and then passed through a sieve of 100 MESH (screen aperture:approximately 150μ). Thus, an additive was obtained.

3.0 parts by weight of this additive, 50 parts by weight of polyethylene resin, 50 parts by weight of polypropylene resin, and 5.0 parts by weight of carbon colored pellets were mixed and stirred by a tumbler mixer. Several tens of plastic base plates were molded continuously from the obtained mixture by using an injection molding machine. When the obtained base plates were inspected, no density irregularities between the base plates or density differences between them were observed. The black color tone of the base plates was clearly different from that of a product of carbon coloring only and manifested a black tone resembling a rich luxurious natural rock. When the strength of the above base plates was compared with that of base plates of carbon coloring only, it was confirmed that the strength of the above base plates became greater. Also, when durability was compared, it was confirmed that changes of black color tone with lapse of time was superior to that of a product of a carbon coloring only.

EXAMPLE 13

100 parts by weight of polyester resin (Tg=55° C.) and 100 parts by weight of magnetic iron oxide powder (including triiron tetroxide or the like, average particle diameter: 0.5 μ) were melted and kneaded together, and crushed by a jet mill. Thus, an additive having a volume average particle diameter of 12.0μ was obtained.

5.0 parts by weight of this additive, 50 parts by weight of polyethylene resin pellets, 50 parts by weight of polypropylene resin pellets, and 5.0 parts by weight of commercially available carbon colored pellets were mixed and stirred by a tumbler mixer. The obtained mixture was put into a molding machine where plastic boundary stakes were molded continuously.

When density irregularities in the obtained boundary stakes and density differences between them were inspected, neither density irregularities nor density differences were observed. When the strength of the boundary stakes was measured, it was confirmed that the strength thereof was superior to the stake of carbon coloring only.

EXAMPLE 14

100 parts by weight of styrene-butyl acetate copolymer resin (Tg=57° C.), 80 parts by weight of magnetic iron oxide fine powder (including triiron tetroxide $Fe_3O_4$, average particle diameter: 0.8 μ), and 8 parts by weight of low-molecular weight polyethylene (weight average molecular weight: 30,000) were melted and kneaded by an extruder, after which an additive of cylindrical pellets having a diameter of approximately 4 mm and a height of approximately 5 mm was manufactured by using a pelletizer.

5.0 parts by weight of this additive and 100 parts by weight of HIPS (impact resistant polystyrene resin) pellet were put into a tumbler mixer where they were mixed and stirred. Thus, a mixture was obtained. This mixture was put into an injection molding machine where several tens of plastic model parts were molded continuously.

When density irregularities in the model parts and density differences between the parts were inspected, no density irregularities or density differences were observed. The model parts had a color black tone which was suitable, because it gave the products the image of massiveness, which color tone was not obtainable by carbon coloring.

EXAMPLE 15

100 parts by weight of styrene-butadiene copolymer resin (Tg=64° C.), 140 parts by weight of magnetic iron oxide (including triiron tetroxide $Fe_3O_4$, average particle diameter: 0.5μ), 10 parts by weight of low-molecular weight polypropylene (weight average molecular weight: 50,000) were kneaded by a roll mill, and put into a crusher where an additive having a particle diameter of 10 mm or less was obtained.

8.0 parts by weight of this additive, 50 parts by weight of polyethylene resin, and 50 parts by weight of polypropylene resin were put into a tumbler mixer where they were mixed and stirred, and a mixture was obtained. The obtained mixture was put into an injection molding machine where several tens of plastic base plates were molded continuously. When the obtained base plates were inspected, no density irregularities within the base plates or density differences between them were observed. The black color tone of the base plates was clearly different from that of a product of carbon coloring only and manifested a black tone resembling a rich luxurious natural rock. When the strength of the above base plates was compared with that of a base plate of carbon coloring only, it was confirmed that the strength of the above base plates became greater.

EXAMPLE 16

100 parts by weight of polyester resin (Tg=54° C.) synthesized from 0.3 mole parts of terephthalic acid, 0.4 mole parts of benzene 1,2,4 tricarboxylic acid, and 1.0 mole part of polyoxypropylene (2,2)-2,2-bis(4-hydroxyphenyl) propane, 80 parts by weight of magnetic iron oxide fine powder (including triiron tetroxide $Fe_3O_4$, average particle diameter: 0.8μ), and 8 parts by weight of low-molecular weight polyethylene (weight average molecular weight: 30,000) were kneaded by a roll mill, crushed by a jet mill, and classified by a classifier. Thus, coloring resin powder having a volume average particle diameter of 7.5 μm and whose content of fine powder of 40 μm or less is 30.0% in terms of number of particles was obtained.

1.0 part by weight of silica powder (primary particle diameter: 30mμ, specific surface: 90 m²/g) and 4.0 parts by weight of paper powder (sampled when PPC paper was cut) were added to 100 parts by weight of the resin powder, mixed and stirred by a Henschel mixer, and then passed through a sieve of 100 MESH (screen aperture:approximately 150μ). Thus, an additive was obtained.

3.0 parts by weight of this additive, 50 parts by weight of polyethylene resin, 50 parts by weight of polypropylene resin, and 5.0 parts by weight of carbon colored pellet were mixed and stirred in the same way as in Example 1. Several tens of plastic base plates were molded continuously from the obtained mixture by using an injection molding machine. When the obtained base plates were inspected, no density irregularities within the base plates or density differences between them were observed. The black color tone of the base plates was clearly different from that of a product of carbon coloring only and manifested a black tone resembling a rich luxurious natural rock. When it was compared with a base plates of carbon coloring only in terms of the strength, it was confirmed that its tensile strength and bending strength were greater. Also, when durability was compared, it was confirmed that change of black color tone with lapse of time was superior to that of a product of a carbon coloring only.

EXAMPLE 17

Cleaning waste toner from a copying machine of Canon Inc. (Model name: NP-3525) was sampled. This waste toner contains about 35% by weight of a magnetic substance, and its resin is styrenic (Tg=59° C.). Approximately 5% by weight of low-molecular weight polyolefine, approximately 0.6% by weight of silica, and approximately 4% by weight of paper powder are contained in the waste toner. The volume average particle diameter of the waste toner is 10.5 μm, and the content of fine powder of 4 μm or less is 35% in terms of number of pieces, which satisfies the requirement of the additive.

5 parts by weight of this waste toner, 100 parts by weight of polyethylene resin coarsely ground, and 5 parts by weight of carbon colored pellet were mixed and stirred and put into a molding machine where plastic boundary stakes were molded continuously.

No color irregularities or density differences between the obtained boundary stakes were observed, and a product of black color tone which gave the product the image of massiveness was obtained. When the strength of the boundary stakes were measured, it was confirmed that the tensile strength and the bending strength thereof were improved more than the stakes of carbon coloring only.

EXAMPLE 18

100 parts by weight of polyester resin (Tg=54° C.) synthesized from 0.5 mole parts of terephthalic acid, 0.33 mole parts of benzene 1,2,4 tricarboxylic acid, and 1.0 mole part of polyoxypropylene (3,3)-2,2-bis(4-hydroxyphenyl) propane, 140 parts by weight of magnetic iron oxide fine powder (including triiron tetroxide $Fe_3O_4$, average particle diameter: 0.5μ), and 10 parts by weight of low-molecular weight polyethylene (weight average molecular weight: 50,000) were kneaded by a roll mill. Thus, an additive having a volume average particle diameter of 20.0μ was obtained.

3.0 parts by weight of this additive, 50 parts by weight of polyethylene resin, 50 parts by weight of polypropylene resin, and 5.0 parts by weight of carbon colored pellet were mixed and stirred by a tumbler mixer. Several tens of plastic base plates were molded continuously from the obtained mixture by using an injection molding machine.

When the obtained base plates were inspected, no density irregularities within the base plates or density differences between them were observed. The black color tone of the base plates was clearly different from that of a product of carbon coloring only and manifested a black tone resembling a rich luxurious natural rock. When the strength of the above base plates was compared with that of a base plates of carbon coloring only, it was confirmed that the strength of the above base plates became greater. Also, when durability was compared, it was confirmed that change of black color tone with lapse of time were superior to that of a product of carbon coloring only.

EXAMPLE 19

10 parts by weight of styrene-vinyl toluene copolymer (Tg=64° C.), 100 parts by weight of magnetic iron oxide (including triiron tetroxide $Fe_3O_4$) powder (average particle diameter: 0.3μ), and 5 parts by weight of low-molecular weight polypropylene (weight average molecular weight: 8,000) were kneaded by a roll mill, after which they were crushed by a jet mill, and classified by a zigzag classifier. Thus, a colored resin powder having a volume average particle diameter of 10.0μ was obtained. 0.5 parts by weight of silica powder (primary particle diameter: 20 mμ, specific surface: 110 m²/g) was added to 100 parts by weight of the resin powder and mixed and stirred by a Henschel mixer, and then passed through a sieve of 100 MESH (screen aperture: approximately 150μ). Thus, an additive was obtained.

4.0 parts by weight of this additive and 100 parts by weight of polystyrene resin pellet of general purpose grade were put into a tumbler mixer where they were mixed and stirred. The mixture was put into an injection molding machine (SH50: manufactured by Sumitomo Heavy Industries, Ltd.), and several tens of plastic trays were molded continuously. When the obtained trays were inspected, no color irregularities within the trays or density differences between the trays were observed.

COMPARATIVE EXAMPLE 4

100 parts by weight of polystyrene resin used in Example 19, and 4 parts by weight of commercially available carbon pellet were mixed and stirred in the same way as in Example 19, and a mixture was obtained. Trays were molded continuously by using the obtained mixture in the same way as in Example 19. No color irregularities within the trays or density differences between the trays were observed. When the strength was measured, it was confirmed that the strength, particularly, the tensile strength of the above tray was weaker than that obtained in Example 19.

EXAMPLE 20

Magnetic toner used in a copying machine (Model name: NP-4550) manufactured by Canon Inc. was sampled. When the characteristics of this magnetic toner were measured, the resin was styrenic resin (Tg=60° C.; number average molecular weight=16,000; weight average molecular weight=300,000), the content of the magnetic substance was approximately 35 wt. %, the content of the low-molecular weight olefin resin was approximately 5 wt. %, and the content of silica was 0.5 wt. %. The above characteristics satisfy the requirement of the additive.

5 parts by weight of this magnetic toner and 100 parts by weight of polyethylene resin pellet were put into a tumbler mixer where they were mixed and stirred. Boundary stakes were molded continuously by using the obtained mixture. No density differences or density irregularities between the boundary stakes were observed. When the strength of the boundary stakes was measured, it was confirmed that the strength thereof was superior to the stake of carbon coloring only.

EXAMPLE 21

After the magnetic toner used in Example 20 was melted and solidified, it was coarsely crushed and then passed through a screen whose diameter of its aperture is 10 mm. Thus, an additive having a particle diameter of 10 mm or less was obtained.

After 50 parts by weight of this additive and 100 parts by weight of polyethylene resin pellet were mixed and stirred, they were put into a molding machine, and boundary stakes were molded continuously. No density differences or density irregularities between the obtained boundary stakes were observed. When the strength of the boundary stakes was measured, it was confirmed that the strength thereof was superior to the stake of carbon coloring only.

EXAMPLE 22

100 parts by weight of polyester resin (Tg=54° C.) synthesized from 0.3 mole parts of terephthalic acid, 0.4 mole parts of benzene 1,2,4 tricarboxylic acid, and 1.0 mole part of polyoxypropylene (2,2)-2,2-bis(4-hydroxyphenyl) propane, 80 parts by weight of magnetic iron oxide fine powder (including triiron tetroxide $Fe_3O_4$, average particle diameter: 0.8μ), 8 parts by weight of low-molecular weight polyethylene (weight average molecular weight:30,000), 1.0 part by weight of silica fine powder (primary particle diameter: 20 mμ, specifid surface: 110 $m^2/g$), and 5 parts by weight of paper powder (sampled when PPC paper was cut) were kneaded by a roll mill and them put into a crusher. Thus, an additive having a particle diameter of 10 mm or less was obtained.

8.0 parts by weight of this additive, 50 parts by weight of polyethylene resin, and 50 parts by weight of polypropylene resin were put into a tumbler mixer where they were mixed and stirred, and a mixture was obrained. The obtained mixture was put into a molding machine where several tens of plastic base plates were molded continuously.

When the obtained base plates were inspected, no density irregularities or density differences were observed. The black color tone of the base plates was clearly different from that of a product of carbon coloring only and manifested a black tone resembling a rich luxurious natural rock. When the strength of the above base plate was compared with that of a base plate of carbon coloring only, it was confirmed that the tensile strength and bending strength of the above base plate have been improved greatly. Further, when durability was compared, it was confirmed that change of black color tone with lapse of time was superior to that of a product of carbon coloring only.

EXAMPLE 23

A cartridge of a laser printer (Model name: LBP-SX) manufactured by Canon Inc. was disassembled, and cleaning waste toner was sampled. This waste toner contains approximately 32 wt. % of a magnetic substance, its resin being styrenic resin (Tg=60° C.; number average molecular weight=30,000; weight average molecular weight=250,000), approximately 5 wt. % of low-molecular weight polyolefine, approximately 0.5 wt. % of silica, and approximately 3 wt. % of paper powder. This satisfies the requirement of the additive.

4.0 parts by weight of this cleaning waste toner and 100 parts by weight of polystyrene resin of general purpose grade were put into a tumbler mixer where they were mixed and stirred. The obtained mixture were put into an injection molding machine (SH50: manufactured by Sumitomo Heavy Industries, Ltd.), and plastic trays were molded continuously. No color irregularities or density differences between the trays were observed. When the strength of the trays was measured, it was confirmed that the tensile strength and bending strength of the above trays have been improved greatly as compared with that of carbon coloring only.

What is claimed is:

1. A plastic additive comprising a thermoplastic polymer, wherein said thermoplastic polymer possesses the characteristics of:

a glass transition temperature of 40° C. to 80° C.;

a number average molecular weight of 50,000 or less; and a weight average molecular weight at least five times that of the number average molecular weight, and said plastic additive has magnetic particles dispersed therein and said plastic additive has a number average particle diameter of 1 to 10 mm.

2. A plastic additive according to claim 1, wherein said thermoplastic polymer is at least one polymer selected from the group consisting of polyester polymers and styrene polymers.

3. A plastic additive according to claim 1, wherein the content of magnetic particles is from 30 to 60 wt. %.

4. A plastic additive according to one of claims 1 to 3, wherein the additive further contains polyolefine polymer having a weight average molecular weight in the range of 700 to 50,000.

5. A plastic composition comprising an additive containing a thermoplastic polymer, said plastic composition further comprising a molding plastic which is different from said thermoplastic polymer, wherein said thermoplastic polymer possesses the characteristics of:

a glass transition temperature of 40° C. to 80° C.;

a number average molecular weight of 50,000 or less; and a weight average molecular weight at least five times that of the number average molecular weight, and said plastic composition has magnetic particles dispersed therein.

6. A plastic composition according to claim 5, wherein said plastic is selected from the group consisting of olefin plastic and impact resistant polystyrene.

7. A plastic composition according to claim 5, wherein the thermoplastic polymer is at least one polymer selected from the group consisting of polyester polymers and styrene polymers.

8. A plastic composition according to claim 5, wherein the average particle diameter of the additive is from 3 μm to 20 mm.

9. A plastic composition according to of claims 6, 7 or 8, wherein the additive further contains polyolefine polymer having a weight average molecular weight in the range of 700 to 50,000.

10. A molding formed of a plastic composition comprising an additive containing a thermoplastic polymer and said plastic composition further comprising a molding plastic which is different from said thermoplastic polymer, wherein said thermoplastic polymer possesses the characteristics of:

a glass transition temperature of 40° C. to 80° C.;

a number average molecular weight of 50,000 or less; and a weight average molecular weight at least five times that of the number average molecular weight, and said molding has magnetic particles dispersed therein.

11. A molding according to claim 10, wherein said plastic is selected from the group consisting of olefin plastic and impact resistant polystyrene.

12. A molding according to claim 10, wherein the thermoplastic polymer is at least one polymer selected from the group consisting of polyester polymers and styrene polymers.

13. A molding according to claim 10, wherein the average particle diameter of the additive is from 3 µm to 20 mm.

14. A molding according to claim 10, 11, 12 or 13, wherein the additive further contains polyolefin polymer having a weight average molecular weight in the range of 700 to 50,000.

* * * * *

UNITED STATES PATENT AND TRADEMARK OFFICE
CERTIFICATE OF CORRECTION

PATENT NO. : 5,648,013

DATED : July 15, 1997

INVENTOR(S) : UCHIDA ET AL.

It is certified that error appears in the above-identified patent and that said Letters Patent is hereby corrected as shown below:

ON TITLE PAGE, REFERENCES CITED, OTHER PUBLICATIONS

"(Diacel" should read --(Daicel--.

COLUMN 1

Line 44, "satisfies" should read --satisfy--.

COLUMN 3

Line 20, "glyceline," should read --glycerine,--;
  Line 21, "allyglycidyl" should read --allylglycidyl--;
  Line 34, "mehacrylate" should read --methacrylate--;
  Line 64, "Solvent:" should read --¶ Solvent:--.

COLUMN 4

Line 19, "have" should read --having--;
  Line 52, "and," should read --and--.

COLUMN 5

Line 15, "ene" should read --ene,--;
  Line 48, "more" should be deleted;
  Line 49, "by" should read --be--.

COLUMN 7

Line 9, "polyolefine" should read --polyolefin--;
  Line 46, "polyolefine," should read --polyolefin,--.

UNITED STATES PATENT AND TRADEMARK OFFICE
CERTIFICATE OF CORRECTION

PATENT NO. : 5,648,013

DATED : July 15, 1997

INVENTOR(S): UCHIDA ET AL.

It is certified that error appears in the above-identified patent and that said Letters Patent is hereby corrected as shown below:

COLUMN 9

```
Line 2,  "pellet" should read --pellets--;
Line 30, "Styreye/2-ethylhexyl" should read
   --Styrene/2-ethylhexyl--.
```

COLUMN 10

```
Line 39, "become" should read --became--.
```

COLUMN 12

```
Line 32, "micrometer)" should read --micrometer).--;
Line 41, "12.8 µm" should read --12.7 µm--;
Line 56, "modling" should read --molding--.
```

COLUMN 14

```
Line 48, "19020" should read --1920--.
```

COLUMN 15

```
Line 26, "comfirmed" should read --confirmed--.
```

COLUMN 16

```
Line 10, "observed." should read --were observed.--.
```

UNITED STATES PATENT AND TRADEMARK OFFICE
CERTIFICATE OF CORRECTION

PATENT NO. : 5,648,013

DATED : July 15, 1997

INVENTOR(S) : UCHIDA ET AL.

It is certified that error appears in the above-identified patent and that said Letters Patent is hereby corrected as shown below:

COLUMN 19

Line 22, "plates" should read --plate--;
Line 34, "polyolefine," should read --polyolefin,--.

COLUMN 20

Line 11, "a" should be deleted.

COLUMN 21

Line 37, "specifid" should read --specific--;
Line 39, "them" should read --then--;
Line 45, "obrained." should read --obtained.--

COLUMN 22

Line 3, "polyolefine," should read --polyolefin,--;
Line 9, "were" read --was--;
Line 36, "polyolefine" should read --polyolefin--;
Line 53, "impact resistant" should read --impact-resistant--;
Line 61, "of claims 6, 7 or 8," should read --claim 5, 6, 7 or 8,--;
Line 62, "polyolefine" should read --polyolefin--.

UNITED STATES PATENT AND TRADEMARK OFFICE
CERTIFICATE OF CORRECTION

PATENT NO. : 5,648,013

DATED : July 15, 1997

INVENTOR(S) : UCHIDA ET AL.

It is certified that error appears in the above-identified patent and that said Letters Patent is hereby corrected as shown below:

COLUMN 23

Line 12, "impact resistant" should read --impact-resistant--.

Signed and Sealed this

Twenty-seventh Day of January, 1998

Attest:

BRUCE LEHMAN

Attesting Officer

Commissioner of Patents and Trademarks